US006791487B1

(12) United States Patent
Singh et al.

(10) Patent No.: US 6,791,487 B1
(45) Date of Patent: Sep. 14, 2004

(54) IMAGING METHODS AND SYSTEMS FOR CONCEALED WEAPON DETECTION

(75) Inventors: Donald R. Singh, Apple Valley, MN (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/383,980

(22) Filed: Mar. 7, 2003

(51) Int. Cl.[7] ............................................... G01S 7/41
(52) U.S. Cl. .......................... 342/22; 342/27; 342/90; 342/192
(58) Field of Search ........................... 342/22, 27, 90, 342/192, 195, 196

(56) References Cited

U.S. PATENT DOCUMENTS

| | | | |
|---|---|---|---|
| 4,521,861 A | * 6/1985 | Logan et al. | 702/57 |
| 4,901,084 A | 2/1990 | Hugueinin et al. | 342/179 |
| 4,910,523 A | 3/1990 | Huguenin et al. | 342/179 |
| 5,047,783 A | 9/1991 | Hugeunin | 342/179 |
| 5,073,782 A | 12/1991 | Huguenin et al. | 342/179 |
| 5,202,692 A | 4/1993 | Huguenin et al. | 342/179 |
| 5,227,800 A | 7/1993 | Huguenin et al. | 342/179 |
| 5,455,590 A | * 10/1995 | Collins et al. | 342/179 |
| 5,557,283 A | * 9/1996 | Sheen et al. | 342/179 |
| 5,760,397 A | * 6/1998 | Huguenin et al. | 250/332 |
| 6,342,696 B1 | 1/2002 | Chadwick | 250/225 |
| 6,359,582 B1 | 3/2002 | MacAleese et al. | 342/22 |
| 6,417,797 B1 | 7/2002 | Cousins et al. | 342/179 |
| 6,445,810 B2 | 9/2002 | Darrell et al. | 382/115 |
| 6,700,527 B1 | * 3/2004 | Martin et al. | 342/25 |
| 6,720,905 B2 | * 4/2004 | Levitan et al. | 342/22 |
| 2001/0017344 A1 | 8/2001 | Aebi | 250/214 VT |
| 2003/0122079 A1 | * 7/2003 | Pobanz et al. | 250/336.1 |
| 2003/0163042 A1 | * 8/2003 | Salmon | 600/436 |

OTHER PUBLICATIONS

"Outdoor passive millimetre wave security screening", Sinclair, G.N.; Anderton, R.N.; Appleby, R.; Security Technology, 2001 IEEE 35th International Carnahan Conference on, Oct. 16–19, 2001 Page(s): 172–179.*

"Millimetre wave aviation security scanner", Murphy, K.S.J.; Appelby, R.; Sinclair, G.; McClumpha, A.; Tatlock, K.; Doney, R.;Hutcheson, I.; Security Technology, 2002. ProCs. 36th Annual 2002 In'l Carnahan Conf. on, Oct. 20–24 Page(s): 162–166.*

"Three–dimensional millimeter–wave imaging for concealed weapon detection", Sheen, D.M.; McMakin, D.L.; Hall, T.E.; Microwave Theory and Techniques, IEEE Transactions on, vol.: 49 Issue: 9, Sep. 2001 P(s): 1581–1592.*

* cited by examiner

Primary Examiner—John B. Sotomayor
(74) Attorney, Agent, or Firm—Kris T. Fredrick; Kermit D. Lopez; Luis M. Ortiz

(57) ABSTRACT

Imaging methods and systems for concealed weapon detection are disclosed. In an active mode, a target can be illuminated by a wide-band RF source. A mechanically scanned antenna, together with a highly sensitive wide-band receiver can then collect and process the signals reflected from the target. In a passive mode, the wide-band receiver detects back-body radiation emanating from the target and possesses sufficient resolution to separate different objects. The received signals can then be processed via a computer and displayed on a display unit thereof for further analysis by security personnel.

19 Claims, 4 Drawing Sheets

IMAGING METHODS AND SYSTEMS FOR CONCEALED WEAPON DETECTION

TECHNICAL FIELD

The present invention is generally related to sensing methods and systems. The present invention is also related to sensors and detectors utilized in security screening operations, such as those found at airports and other transportation centers. The present invention is specifically related to RF energy scanning and imaging methods and systems.

BACKGROUND OF THE INVENTION

In light of the increasing threat of terrorism, a greater need for concealed weapon detection methods and systems for use at security checkpoints, such as those located at airports and other transportation hubs, is urgently needed. Conventional security systems include devices such as metal detectors and X-ray systems. Metal detectors can only detect metal objects such as knives and handguns. In addition, such devices cannot discriminate between innocuous items such as glasses, belt buckles, keys, and so forth, and are essentially useless in detecting modem threats posed by plastics, ceramic handguns, knives and even more dangerous items such as plastic and liquid explosives.

In order for sensors to detect concealed munitions beneath clothing, such devices must operate at frequencies that penetrate clothing barriers. This can be achieved by X-ray imaging. Although very effective for certain security tasks, X-ray imaging poses a serious health risk due to X-ray exposure and is therefore unacceptable to the public. Moreover, X-ray systems are not capable of remote imaging, which is rapidly emerging as a necessity in such security screening applications.

The present inventors believe that RF energy in the millimeter-wave (e.g., 30 GHz to 300 GHz) range, which can easily penetrate clothing, offers a possible solution for concealed weapon detection and imaging. Moreover, the present inventors believe that millimeter wave imaging systems can be either totally passive (non-radiating), or operate at very low power levels which poses no known threat to humans.

Current millimeter-wave imaging systems (e.g. Millivision's hand-held scanner) operate in the 94 GHz band, providing a limited resolution to allow distinction between innocuous items and real threats, and lacks remote imaging capabilities. These systems include the following techniques; focal-plane 2D array and the holography. The first technique can be passive or active and incorporates an array of detectors placed at the focal plane of a large lens system. The main advantages are possible real-time imaging, compact size, operating akin to an optical camera. Disadvantages, however, include low resolution, small aperture size and field of view (FOV) and high cost.

Holographic imaging techniques utilize a linear array of sequentially switched transmitter/receivers operating at a single frequency. This array can be scanned quickly over a large aperture to effectively illuminate a target and the collected coherent returned signal can then be recorded and mathematically reconstructed in a computer to form a focused image without the need of a lens. Advantages include high resolution, mathematical focusing at any depth, large FOV. The chief disadvantage is the short depth of focus and the long range imaging capability. The present inventors thus believe that none of the aforementioned techniques have demonstrated real time imaging and the possibility of high-resolution long-range imaging for use in effective security screening. The present inventors therefore propose an improved method and system for concealed weapon detection for use in security screening, which is described in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved sensing methods and systems.

It is another aspect of the present invention to provide for improved sensors and detectors utilized in security screening operations, such as those found at airports and other transportation centers.

It is yet another aspect of the present invention to provide for improved RF energy scanning and imaging methods and systems.

It is still another aspect of the present invention to provide for improved methods and systems for concealed weapon detection.

The aforementioned aspects of the invention and other objectives and advantages can now be achieved as is now summarized. Imaging methods and systems for concealed weapon detection are disclosed herein. In the active mode, a target can be illuminated for concealed weapon detection utilizing an illumination module that includes at least one wide-band RF source and at least one wide-beam antenna. Signals reflected from the target as a result of illumination by the illumination module can then be detected utilizing a scanning module that includes at least one scanning antenna in association with at least one wide-band millimeter-wave receiver.

The scanning antenna and the millimeter-wave receiver together collect the one or more signals reflected from the target, which can then be further analyzed and imaged for improved detection of concealed weapons. In the passive mode the receiver with scanning antenna acts in a manner that is analogous to a highly sensitive radiometer. Data scanned from the target by the scanning module can then be processed and displayed for further analysis by security personnel. Such data generally includes information concerning objects of the target that represent potentially concealed weapons.

The imaging methods and systems described herein preferably operate at a unique frequency of 140 GHz and afford real time imaging capabilities, high resolution, large field-of-view (FOV) and long range imaging. The high frequency of operation results in a small antenna size and provides for a fine spatial resolution that is highly desirable for effective imaging, particularly in the context of security screening operations. In an active mode, a target is illuminated by wide-band RF source. A mechanically scanned antenna, together with a highly sensitive wide-band millimeter-wave receiver can collect and process the signals reflected from the target. In a passive mode, the receiver detects black-body radiation emanating from the target and possesses sufficient resolution to separate different objects. The received signals can then be processed via a computer and displayed on a display unit thereof.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
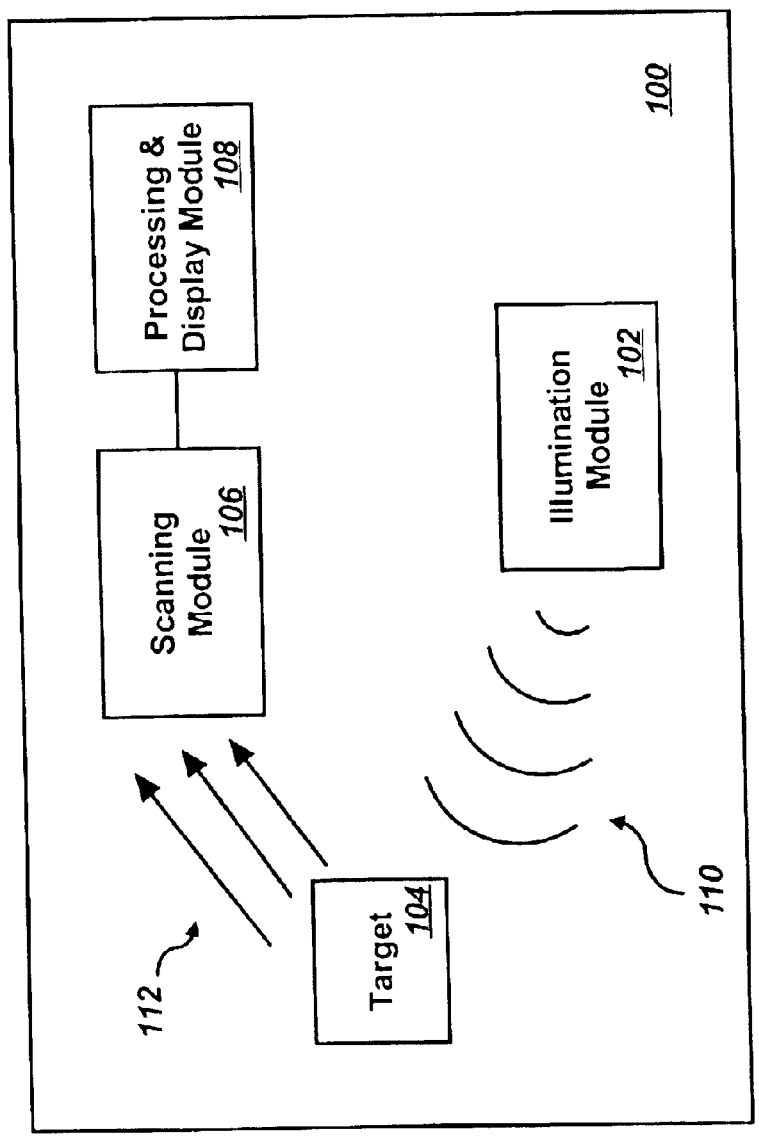
FIG. 1 illustrates a high-level block diagram of a concealed weapon detection and imaging system, which can be implemented in accordance with a preferred embodiment of the present invention.

FIG. 1 illustrates a high-level block diagram of a concealed weapon detection and imaging system 100, which can be implemented in accordance with a preferred embodiment of the present invention. System 100 incorporates both active and passive modes of operation. Thus, it generally includes an illumination module 102 for illuminating a target 104, as indicated by curved lines 110. System 100 also includes a scanning module 106 for scanning target 104. Scanning module 106 generally collects and processes one or more signals 112 reflected from target 104 as a result of the illumination of target 102 by illumination module 102 as well as those emitted from the target in the form of black body radiation.

Scanning module 106 also includes a processing and display module 108, which can further process and display for a user, data scanned from target 104 by scanning module 106. Such data generally includes information about target 104, scanned objects that are potentially concealed weapons. Target 104 can thus be, for example, an individual carrying a concealed weapon or other dangerous objects. System 100 generally can operate at a frequency of 140 GHz to afford real-time imaging capabilities, high resolution, field-of-view (FOV), and long range imaging as explained in greater detail herein.

Figure 2:
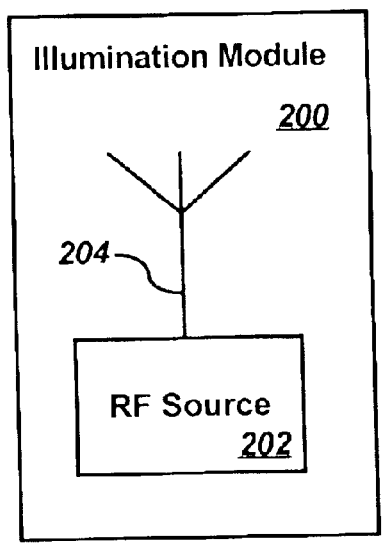
FIG. 2 illustrates a block diagram of an illumination module, which can be implemented in accordance with a preferred embodiment of the present invention.

FIG. 2 illustrates a block diagram of an illumination module 200, which can be implemented in accordance with a preferred embodiment of the present invention. Illumination module 200 of FIG. 2 is generally analogous to illumination module 102 of FIG. 1 and can be implemented in place of illumination module 102. In general, illumination module 200 includes a radio frequency (RF) source 202 and a fixed antenna 204. Illumination module 200 thus generally constitutes a fixed wide beam width and wide-band source utilized to illuminate a target, such as target 102 illustrated in FIG. 1.

Figure 3:
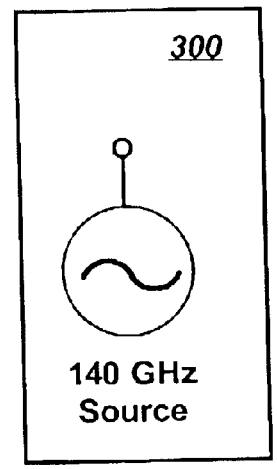
FIG. 3 illustrates a block diagram of a radio frequency source, which can be implemented in accordance with a preferred embodiment of the present invention.

FIG. 3 illustrates a block diagram of an RF source 300, which can be implemented in accordance with a preferred embodiment of the present invention. RF source 300 is generally analogous to RF source 202 of FIG. 2. RF source 300 can be implemented as RF source 202 of FIG. 2. RF source 300 generally includes a 140 GHz RF (i.e., a voltage controlled oscillator 302), such as, for example, a Gunn oscillator that provides an output in a range of approximately 10 mW to 30 mW. RF source 300 generally functions as an illumination source for illumination module 200 of FIG. 3. Voltage tuning permits oscillator 302 to be effortlessly modulated.

Figure 4:
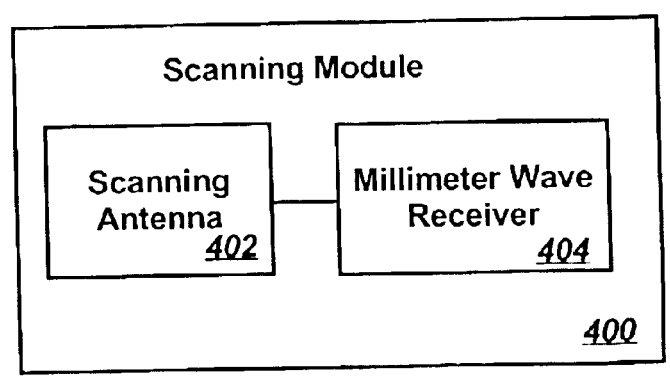
FIG. 4 illustrates a block diagram of a scanning module, including a millimeter wave receiver thereof, which can be implemented in accordance with a preferred embodiment of the present invention.

FIG. 4 illustrates a block diagram of a scanning module 500, including a millimeter wave receiver 504 thereof, which can be implemented in accordance with a preferred embodiment of the present invention. Scanning module 500 generally includes a scanning antenna 502, which generally constitutes a narrow-beam mechanically scanned antenna, which together with the highly sensitive wide-band receiver 504 collects and processes signals, such as signals 112, reflected from target 104. In a passive mode, receiver 504 can detect black-body radiation from target 104 and has sufficient resolution to separate different objects associated with target 104. These signals can be processed by processing and display module 108, which is explained in greater detail herein with respect to FIG. 6.

Figure 5:
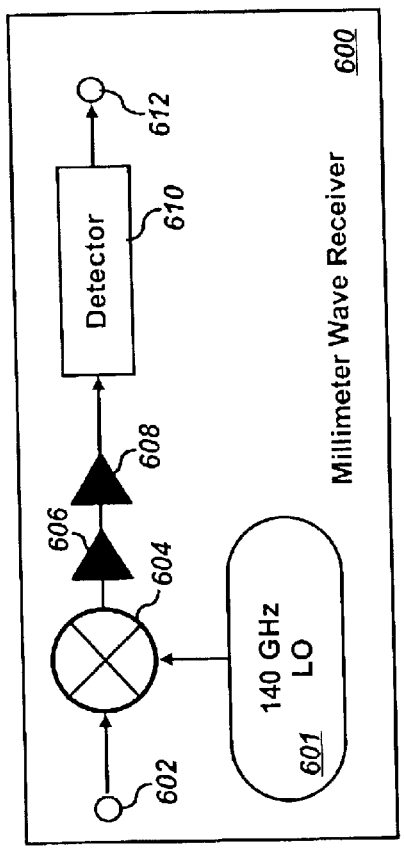
FIG. 5 illustrates a block diagram of a millimeter wave receiver, which can be implemented in accordance with a preferred embodiment of the present invention.

FIG. 5 illustrates a block diagram of a millimeter wave receiver 600, which can be implemented in accordance with a preferred embodiment of the present invention. Millimeter wave receiver 600 of FIG. 5 is generally analogous to millimeter wave receiver 504 of FIG. 6 and can be implemented in the context of scanning modules 106 and 500, which are illustrated and described herein respective with respect to FIGS. 1, and 5. Millimeter wave receiver 600 generally includes respective input and output nodes 602 and 612 in association with a wide-band balanced mixer 604, a local oscillator 601, and IF amplifiers 606 and 608, which provide output to a detector 610.

The overall noise of millimeter wave receiver 600 is expected to be less than 9 dB (DSB) at 140 GHz over a bandwidth of at least 5 GHz. With such a low-noise receiver, the power required to illuminate a target, such as target 104 of FIG. 1, in an active mode is very small (e.g., less than 5 mW). Moreover, in a passive mode, a radiometric temperature difference ($\Delta T$) of 1K can be easily achieved. This further improves image contrast and lowers integration for real-time imaging via a processing and display module, such as the processing and display module 108 of FIG. 1, which is explained in greater detail with respect to FIG. 6 herein.

Figure 6:
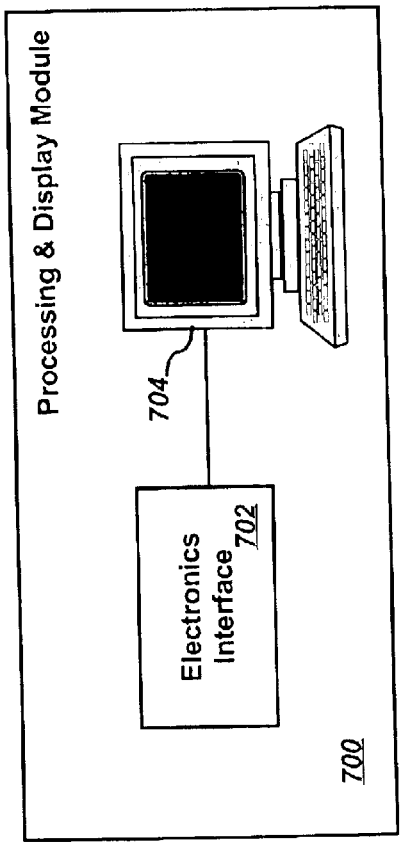
FIG. 6 illustrates a block diagram of a processing and display module, which can be implemented in accordance with a preferred embodiment of the present invention.

FIG. 6 illustrates a block diagram of a processing and display module 700, which can be implemented in accordance with a preferred embodiment of the present invention. Processing and display module 700 of FIG. 6 is generally analogous to processing and display module 108 of FIG. 1. Processing and display module 700 includes an electronics interface 702 which can communicate with a computer 704 that includes a monitor upon which images can be displayed. It can be appreciated by those skilled in the art that computer 704 can generally be implemented as embedded hardware and software for processing and displaying the imaging data.

Thus, signals 112 reflected from 104 can be collected and processed by scanning module 106 of FIG. 1 and then transmitted for further processing via computer 704 for imaging at a monitor or display unit thereof.

The term "computer" is well-known in the art and thus a detailed description of a computer is not necessary. In general, the term "computer" as utilized herein refers to a data-processing system and/or device, and generally can be implemented as a machine that accepts structured input, produces it according to prescribed rules, and produces the results as output. Computers generally can be classified as supercomputers, mainframes, super-minicomputers, mini computers, personal computers, including associated peripheral devices (e.g., monitors, printers, etc.), workstations and/or microcomputers (e.g., laptops, PDA devices, etc.).

Figure 7:
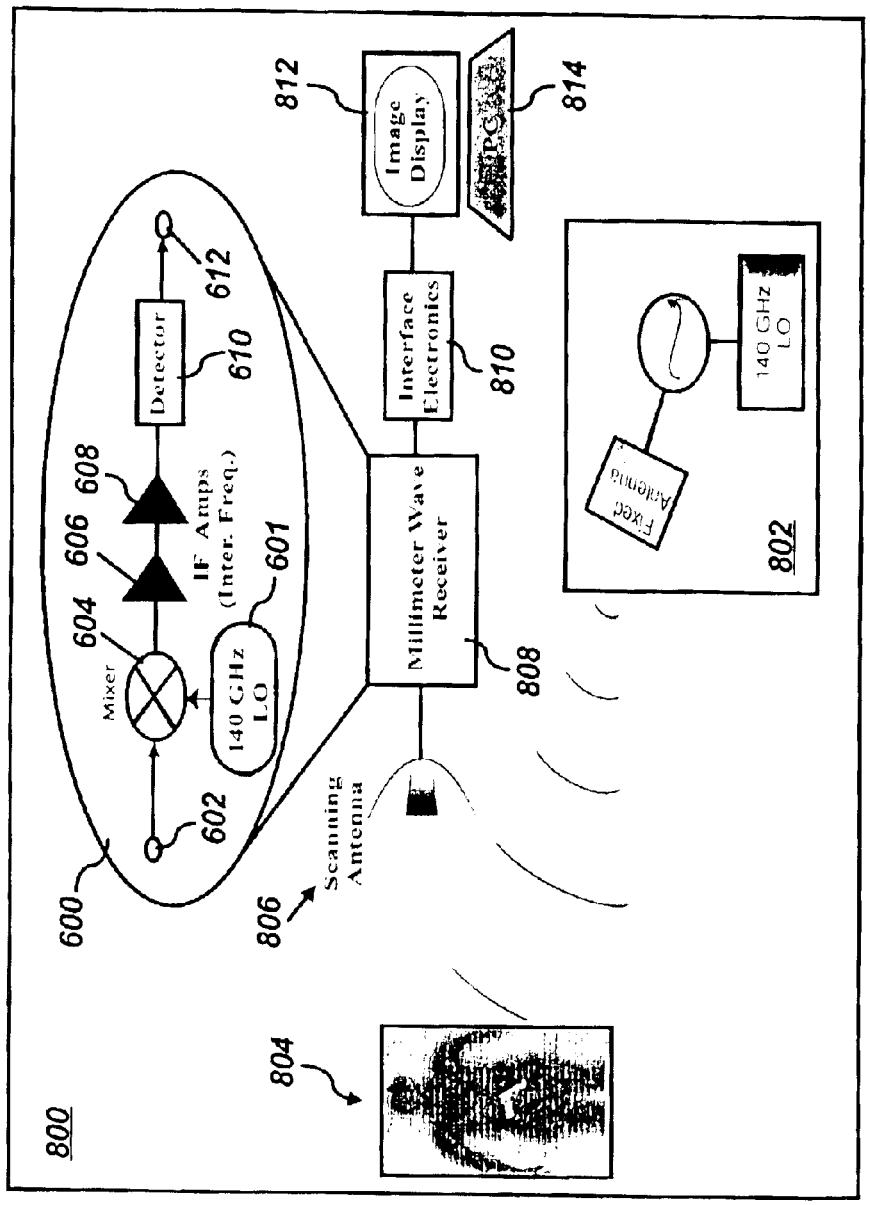
FIG. 7 illustrates a block diagram of a concealed weapon detection and imaging system, which can be implemented in accordance with an alternative embodiment of the present invention.

FIG. 7 illustrates a block diagram of a concealed weapon detection and imaging system 800, which can be implemented in accordance with an alternative embodiment of the present invention. In general, concealed weapon detection can be accomplished utilizing a unique millimeter wave system with real-time imaging capabilities, high resolution, large FOV and long distance (i.e., remote) imaging possibility. An optimum frequency range between 80 GHz–150 GHz is suitable for adequate transmission through clothing and to distinguish different objects from each other and the skin. Such a frequency range can also provide very high spatial resolution for imaging while maintaining antenna size to practical levels.

Thus, based on overall system parameters for concealed weapon detection, as shown in Table 1 below, an operating frequency in an atmospheric window of 140 GHz is considered most appropriate in the context of system 800 of FIG. 7. It can be appreciated by those skilled in the art, however, that although 140 GHz is a preferable operating frequency, variations to this frequency may also be implemented in the context of alternative embodiments of the present invention. Thus, with a smaller wavelength and an increased contrast between the reflectivity of skin and objects imaging system 800 at 140 GHz is expected to perform better (e.g., approximately 50% or more) than a corresponding system operating at 94 GHz.

TABLE 1

System Parameters for Concealed Weapon Detection

Concealed Objects

| | |
|---|---|
| Material | Metal, Plastic, Wood, Glass, etc. |
| Size | 1" (min) |
| Clothing | Cotton, Wool, Nylon, Polyester, Flannel, etc. |
| Range | 0 to 20 Meters |
| Imaging | Real Time (~10 frames/sec) or better |
| Field-of-View (FOV) | ~±20 Degrees |

System 800 thus generally includes a fixed wide beam-width and wide-band source 802, which is utilized to illuminate a target 804, in the active mode. A narrow-beam mechanically scanned antenna 806 together with a highly sensitive wide-band receiver 808 can be utilized to collect the reflected waves in the active mode. In the passive mode, the wide-band receiver 808 together with the scanning antenna 806 can function as a highly sensitive radiometer. Interface electronics 810, together with a personal computer (PC) 814, can be utilized to control the scanning antenna and receiver 808, as well as to store and display the data on a display monitor 812. Wide-band receiver 808 can be implemented as a millimeter wave receiver 808, which is shown in greater detail as millimeter wave receiver 600 in FIG. 8, and which is identical to the millimeter wave receiver 600 depicted in FIG. 6.

In accordance with one possible embodiment of the present invention, the mechanically scanned antenna 806 can possess a beam-width of approximately 1 degree to 2 degree, with a FOV of ±20 degrees, a scan rate (i.e., associated with a close to real time operation) of 10 frame/sec or better, and an RF bandwidth of 5 GHz or better. The illuminating source 802 can be configured as a voltage controlled Gunn oscillator with a power output in a range of approximately 10 mW to 30 mW. Voltage tuning allows the oscillator to be easily modulated.

The receiver 808 can be implemented according to a low-noise heterodyne architecture that includes a wide-band balanced mixer 604, local oscillator 601, IF amplifiers 606, 608 and detector 610. The overall noise of receiver 808 is estimated to be less than 9 dB (DSB) at 140 GHz over a bandwidth of at least 5 GHz. With such a low-noise receiver, the power required to illuminate the target 804 in the active mode is very small (e.g., <5 mW). In the passive mode, however, a radiometric (uncooled) temperature difference ($\Delta T$) of 1K can be easily achieved. This further improves the image contrast and lowers integration time for real-time imaging.

Images in a single frequency system can be affected by speckles due to interference from varying reflection points on the target at different ranges. The large bandwidth, however, of the receiver 808, together with the wide-band fixed antenna, allows one to sweep the system 800 over a wide frequency range thereby largely eliminating speckles and improving the image quality.

One advantages of utilizing the 140 GHz imaging system 800 for airport security is that a 140 GHz imaging system 800 would allow weapons to be distinguished from innocuous objects such as coins, prostheses, and so forth, thereby lowering the false-alarm rate. Another advantage of utilizing system 800 is that it would not be necessary for airline passengers to empty their pockets of innocuous metallic items when passing through an entry security checkpoint, thereby increasing throughput without sacrificing system effectiveness.

An additional advantage of a 140 GHz imaging system, is that such a system can be utilized to detect modem threats such plastic and ceramic handguns and knives and even more dangerous items such as plastic and liquid explosives, which is not possible with standard metal detection systems. Additionally, system 800 can provide for the possibility of long-range remote imaging. Therefore, airline passengers can be "electronically frisked" by a MMW imaging sensor in a fast, covert and efficient manner leading to a much higher level of security.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art. It is contemplated that the use of the present invention can involve components having different characteristics. It is intended that the scope of the present invention be defined by the claims appended hereto, giving full cognizance to equivalents in all respects.

What is claimed is:

1. An imaging method for concealed weapon detection, said method comprising the steps of:
   illuminating a target for concealed weapon detection thereof utilizing an illumination module that includes at least one wide-band RF source and at least one wide-beam antenna; and
   detecting said target utilizing a scanning module that includes at least one scanning antenna in association with at least one wide-band receiver for collecting and processing at least one signal reflected from said target as a result of said illumination of said target for concealed weapon detection thereof; and
   configuring said at least one wide-band receiver of said scanning module to possess a resolution that differentiates between concealed weapons and other objects of said target.

2. The method of claim 1 further comprising the steps of:
   processing and displaying data scanned from said target by said scanning module, wherein said data includes information concerning objects of said target, which are potentially concealed weapons.

3. The method of claim 1 further comprising the step of:
   detecting black-body radiation from said target utilizing said at least one wide-band receiver of said scanning module, wherein said black-body radiation is detectable as a result of said illumination of said target.

4. The method of claim 1 further comprising the step of:
   operating said at least one wide-band RF source of said illumination module in a radio frequency range of 80 GHz to 150 GHz.

5. The method of claim 1 wherein said scanning module detects signals reflected from said target at approximately 140 GHz.

6. The method of claim 1 further comprising the step of:
   configuring said at least one wide-band receiver of said scanning module to comprise a millimeter wide receiver.

7. The method of claim 6 further comprising the step of:
   configuring said millimeter wide receiver to comprise a wide-band balanced mixer associated with a local oscillator, a plurality of IF amplifiers and at least one detector in a low-noise heterodyne arrangement.

8. The method of claim 1 further comprising the step of:
   fixing said at least one wide-beam antenna to said at least one wide-band RF source.

9. An imaging method for concealed weapon detection, said method comprising the steps of:
   illuminating a target for concealed weapon detection thereof utilizing an illumination module that includes at least one wide-beam antenna fixed to at least one wide-band RF source;
   operating said at least one wide-band RF source of said illumination module in a radio frequency range of 80 GHz to 150 GHz;
   scanning said target at a radio frequency of 140 GHz utilizing a scanning module that includes at least one scanning antenna in association with at least one wide-band receiver for collecting and processing at least one signal reflected from said target as a result of said illumination of said target for concealed weapon detection thereof;
   processing and displaying data scanned from said target by said scanning module, wherein said data includes information concerning objects of said target, which are potentially concealed weapons;
   detecting black-body radiation from said target utilizing said at least one wide-band receiver of said scanning module, wherein said black-body radiation is detectable as a result of said illumination of said target; and
   configuring said at least one wide-band receiver of said scanning module to possess a resolution that differentiates between concealed weapons and other objects of said target.

10. An imaging system for concealed weapon detection, said system comprising:
    an illumination module for illuminating a target, wherein said illumination module includes at least one wide-band RF source and at least one wide-beam antenna for illumination of said target; and
    a scanning module for scanning said target, wherein said scanning module includes at least one scanning antenna in association with at least one wide-band millimeter-wave receiver for collecting and processing at least one signal reflected from said target as a result of said illumination of said target by said illumination module for detection of a concealed weapon of said target.

11. The system of claim 10 further comprising:
    a processing and display module for processing and displaying data regarding objects of said target, wherein said processing and display module includes an electronics interface for electronically interfacing data communication between said scanning module and a computer having a display unit for display of said data.

12. The system of claim 10 wherein said at least one wide-band millimeter-wave receiver of said scanning module detects back-body radiation from said target as a result of said illumination and possess a resolution necessary to differentiate between said concealed weapon and other objects of said target.

13. The system of claim 10 wherein said at least one wide-band RF source of said illumination module provides a radio frequency source in a range of 80 GHz to 150 GHz.

14. The system of claim 10 wherein illumination module illuminates said target at a radio frequency of approximately 140 GHz.

15. The system of claim 14 wherein said scanning module detects signals reflected from said target at a radio frequency of approximately 140 GHz as a result of said illumination of said target by said illumination module.

16. The system of claim 10 wherein said wide-band receiver of said scanning module comprises a millimeter-wave receiver.

17. The system of claim 16 wherein said millimeter-wave receiver comprises a wide-band balanced mixer associated with a local oscillator, a plurality of IF amplifiers and at least one detector in a low-noise heterodyne arrangement.

18. The system of claim 10 wherein said at least one wide-beam antenna is fixed to said at least one wide-band RF source.

19. The system of claim 10 wherein said illumination module comprises a voltage controlled oscillator that provides an output in a range of approximately 10 mW to 30 mW.

* * * * *